United States Patent
Delaney et al.

(10) Patent No.: US 10,080,249 B1
(45) Date of Patent: Sep. 18, 2018

(54) SYSTEMS AND METHODS FOR PROVIDING DISCRETE ACCESS TO AN ONLINE SERVICE

(71) Applicant: Berryville Holdings, LLC, Berryville, VA (US)

(72) Inventors: Christopher Edward Delaney, Berryville, VA (US); Chava Louis Jurado, Las Cruces, NM (US); Carl Bailey Jacobs, Fredericksburg, VA (US); Scott Christian Green, Taylors, SC (US)

(73) Assignee: Berryville Holdings, LLC, Herndon, VA (US)

( * ) Notice: Subject to any disclaimer, the term of this patent is extended or adjusted under 35 U.S.C. 154(b) by 0 days.

(21) Appl. No.: 15/189,053

(22) Filed: Jun. 22, 2016

Related U.S. Application Data

(60) Provisional application No. 62/184,531, filed on Jun. 25, 2015.

(51) Int. Cl.

| | |
|---|---|
| *G01R 5/12* | (2006.01) |
| *H04W 76/12* | (2018.01) |
| *H04W 76/02* | (2009.01) |
| *H04W 72/04* | (2009.01) |
| *H04W 80/12* | (2009.01) |
| *H04W 88/18* | (2009.01) |

(52) U.S. Cl.
CPC ....... *H04W 76/12* (2018.02); *H04W 72/0453* (2013.01); *H04W 76/022* (2013.01); *H04W 80/12* (2013.01); *H04W 88/182* (2013.01)

(58) Field of Classification Search
CPC .................................. H04L 12/66; G10L 11/00
USPC .................................................. 370/252–352
See application file for complete search history.

(56) References Cited

U.S. PATENT DOCUMENTS

| | | | |
|---|---|---|---|
| 7,043,564 B1 * | 5/2006 | Cook | H04L 29/12009 709/223 |
| 9,137,131 B1 * | 9/2015 | Sarukkai | H04L 43/0876 |
| 9,800,681 B2 * | 10/2017 | Sarukkai | H04L 67/2814 |

* cited by examiner

*Primary Examiner* — Iqbal Zaidi
(74) *Attorney, Agent, or Firm* — Jones Day

(57) ABSTRACT

Systems and methods are provided for facilitating a discreet connection between a user and a service. A system includes a service for a user to connect to without any detectable direct contact with the service. A first reverse proxy connection is configured to receive a connection from the user to set up the discreet connection, where an invitation indicating a mechanism for accessing the first reverse proxy connection is provided to the user. Access credentials are transmitted to the user over the first reverse proxy connection, the access credentials including an address for accessing a second reverse proxy connection, the first reverse proxy connection being deleted following delivery of the access credentials. The second reverse proxy connection facilitates the discreet connection between the user and the service without any detectable direct contact with the service.

20 Claims, 9 Drawing Sheets

SYSTEMS AND METHODS FOR PROVIDING DISCRETE ACCESS TO AN ONLINE SERVICE

CROSS REFERENCE TO RELATED APPLICATIONS

This application claims priority to U.S. Provisional Application No. 62/184,531, filed Jun. 25, 2015, entitled "Systems And Methods For Providing Discrete Access To An Online Service," the entirety of which is herein incorporated by reference.

TECHNICAL FIELD

The technology described herein relates generally to computing resource access and more particularly to proving discrete or untraceable access to a computing resource.

BACKGROUND

Privacy and anonymity online can be vital tools for fostering a healthy and growing society. For example, maintaining privacy can protect users from malicious activities, such as stealing of personal data, as one performs activities (e.g., online banking). Anonymity can promote free speech by eliminating fear of repercussion from parties who are adverse to such speech. Traditionally, privacy and anonymity were maintained online by a service itself (e.g., by requiring password authentication; by allowing users to operate under pseudonyms). However, sophisticated observers might still be able to detect that a person is interacting with a service, such as by monitoring traffic to and from the service, even if the exact details of that interaction are not detectable. Systems and methods as described herein can further promote privacy and anonymity by completely or substantially preventing unwanted monitoring of a person's interaction with an online service.

SUMMARY

Systems and methods are provided for facilitating a discreet connection between a user and a service. A system includes a service for a user to connect to without any detectable direct contact with the service. A first reverse proxy connection is configured to receive a connection from the user to set up the discreet connection, where an invitation indicating a mechanism for accessing the first reverse proxy connection is provided to the user. Access credentials are transmitted to the user over the first reverse proxy connection, the access credentials including an address for accessing a second reverse proxy connection, the first reverse proxy connection being deleted following delivery of the access credentials. The second reverse proxy connection facilitates the discreet connection between the user and the service without any detectable direct contact with the service.

As another example, a computer-implemented method of facilitating a discreet connection between a user and a service includes operating a service for a user to connect to without any detectable direct contact with the service. A first reverse proxy connection is initiated that is configured to receive a connection from the user to set up the discreet connection, where an invitation indicating a mechanism for accessing the first reverse proxy connection is provided to the user. Access credentials are transmitted to the user over the first reverse proxy connection, the access credentials including an address for accessing a second reverse proxy connection. The first reverse proxy connection is deleted following delivery of the access credentials, and the second reverse proxy connection that facilitates the discreet connection between the user and the service without any detectable direct contact with the service is initiated.

DETAILED DESCRIPTION

Figure 1:
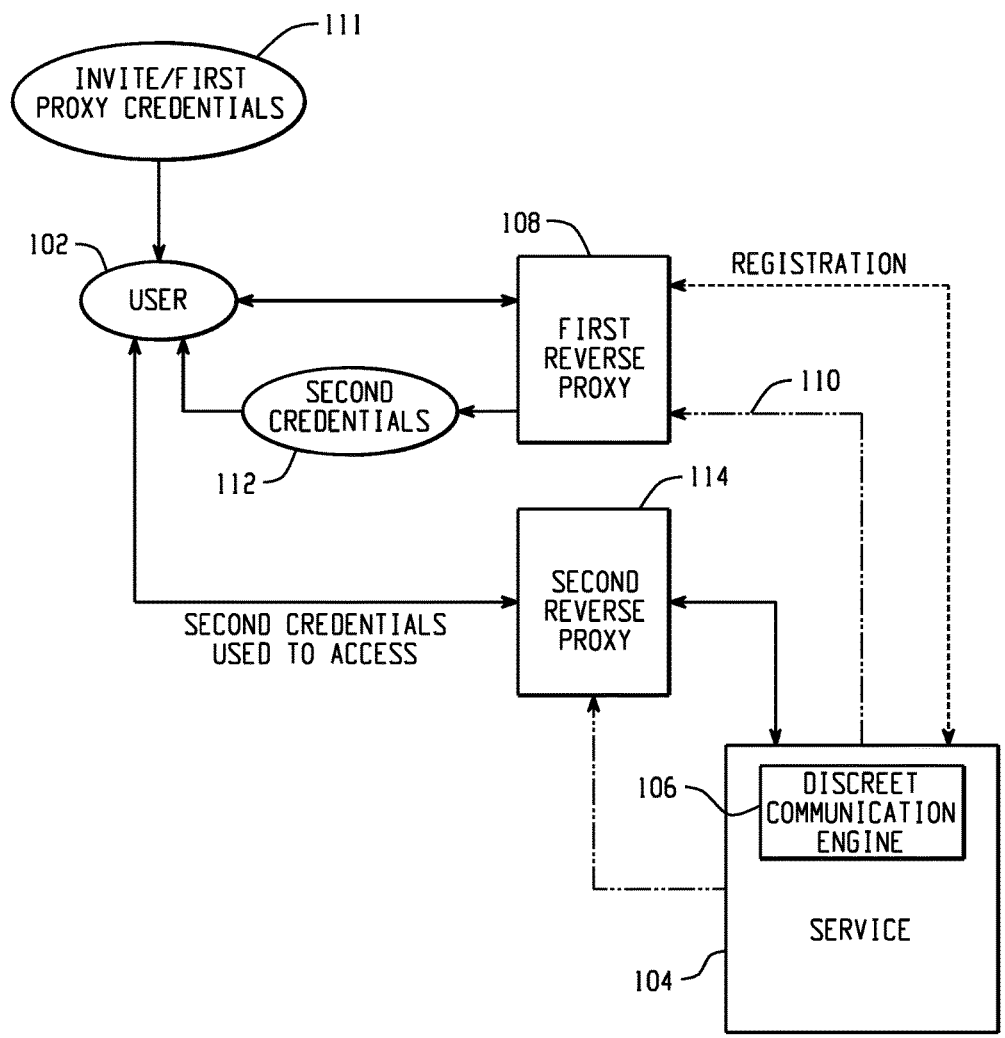
FIG. 1 is a diagram depicting an example portal proxy to facilitate discrete access to a service.

FIG. 1 is a diagram depicting an example portal proxy to facilitate discrete access to a service. A portal proxy is a mechanism for creating a non-attributable pathway for a user (client) to connect to a service. As noted above, it can be possible for a sophisticated observer to determine that a user is interacting with a service through monitoring of traffic with the service. For example, the observer could snoop transmitter or destination data of packets to and from the service, respectively, to determine information about the user. Through a configuration of reverse proxy servers, a system is implemented that prevents such user identification.

A reverse proxy is a type of proxy server that retrieves resources on behalf of a client from one or more servers. The resources are returned to the client as though they originated from the proxy server itself. A reverse proxy acts as an intermediary for its associated servers to be contacted by a user (e.g., any client). While a single reverse proxy could increase a difficulty for an observer to identify users communicating with a service (i.e., the observer would need to monitor traffic to/from the reverse proxy, as opposed to to/from the service, requiring knowledge of details of the reverse proxy), it is not a complete solution. Because the user must be made aware of connection information about the reverse proxy (e.g., the reverse proxy address), the observer may be able to similarly acquire the connection information. The configuration of FIG. 1 further obscures the user's connection to the server.

In the example of FIG. 1, a user 102 seeks to interact with a service 104 in a discreet manner. A discreet communication engine 106 of the service 104 facilitates this connection.

The discreet communication engine 106 initiates a first reverse proxy 108 for the user to connect, as indicated at 110. Credentials 111 (e.g., first reverse proxy address, user name, password) for accessing the first reverse proxy 108 are provided to the user 102. The credentials 111 can be provided to the user in a number of ways, some more secure than others. For example, the credentials 111 can be provided via an e-mail, a social media private message, a near field communication message, a verbal communication, a written communication, a text message, a quick response code, or otherwise. The user 102 connects to the first reverse proxy 108. Because the providing of the first credentials 111 is not necessarily secure, further operations are performed to connect to the service 104.

If this is the user's first time connecting to the service 104, the user 102 may interact with the service 104 as part of a registration process. A secure communication channel (e.g., an SSL link) is established, over which a second set of credentials 112 (e.g., second reverse proxy address) for a second reverse proxy 114 is transmitted to the user. The user 102 uses the second credentials 112 to access the second reverse proxy 114, which establishes a further secured link to the service 104. The user 102 then has a secure and private link to the service 104 via a connection point that the user 102 can be confident is unknown to observers. Once the user 102 disconnects from the first reverse proxy 108, that proxy 108 can be deallocated, deleted, or otherwise disposed. In some embodiments, the first reverse proxy 108 may be reused at a later time (e.g., by other users).

The first and second reverse proxies 108, 114 of FIG. 1 can be implemented in a variety of ways. For example, the proxies 108, 114 can be provisioned from a commercial service, such as a commercial platform as a service (PaaS) provider such as Amazon or Pivotal Cloud Foundary. Alternatively, the proxies 108, 114 can be provisioned from private computing resources. For example, the proxies 108, 114 can be provided by other users of the service 104 (e.g., a desk top computer, a smart phone device, a tablet device, or a mobile phone of the other service user). Examples of such provisioning of component computing resources is described in U.S. Provisional Patent Application No. 62/121,266, entitled Systems and Methods for Implementing an On-Demand Computing Network Environment, the entirety of which is herein incorporated by reference.

The portal proxy (e.g., the first reverse proxy 108 and the second reverse proxy 114) of FIG. 1 can have a variety of benefits in different embodiments of the disclosure. A portal proxy can be dynamic, meaning that it can be changed on a time or per usage basis. The portal proxy, in one example, provides a means of user A to provide access to a unique portal proxy to user B without user A being aware of continued use of that link. The portal proxy can protect service users by providing each user with their own unique URL or address to access the underlying service. In one embodiment, portal proxies are on demand. In the case of a PaaS arrangement, the proxies are not created until a user exists, and the proxies exist no longer (or only very shortly longer) than the user continues to use the proxy. In the case of proxies provided by service users, the portals may be assigned to users in ways that the user will never use the same portal proxy more than once.

Figure 2:
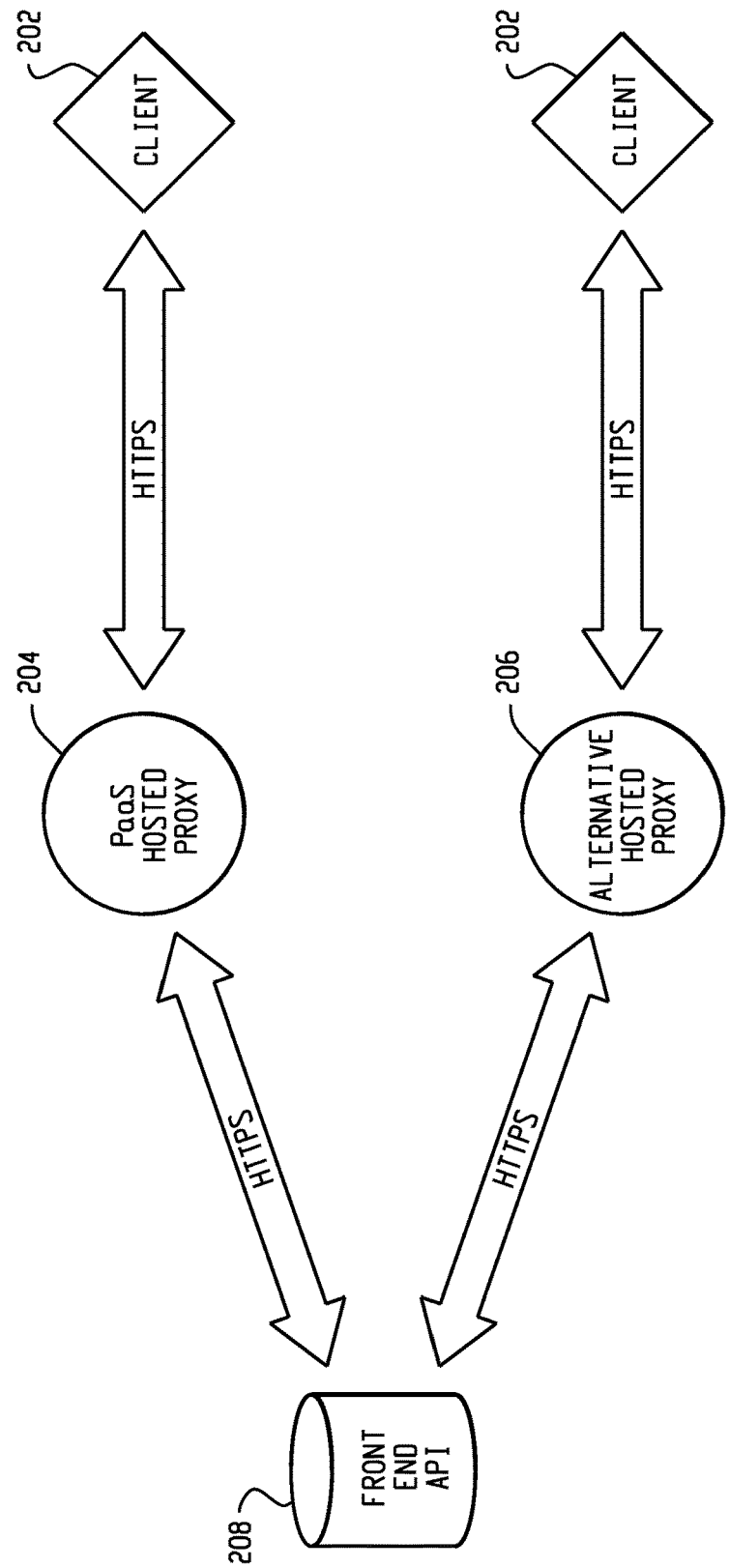
FIG. 2 is a diagram illustrating example ways for a client to access a front end application programming interface of the service via a first reverse proxy.

FIG. 2 is a diagram illustrating example ways for a client (user) to access a front end application programming interface (API) of the service via a first reverse proxy. The client 202 is provided first credentials that include an address of a first reverse proxy, either a PaaS hosted proxy 204 or a service user or otherwise provided proxy 206. Those reverse proxies 204, 206 connect to the API 208 to establish a first secure connection with the user 202. Second credentials for connecting to a second reverse proxy are communicated via that secure channel.

Figure 3:
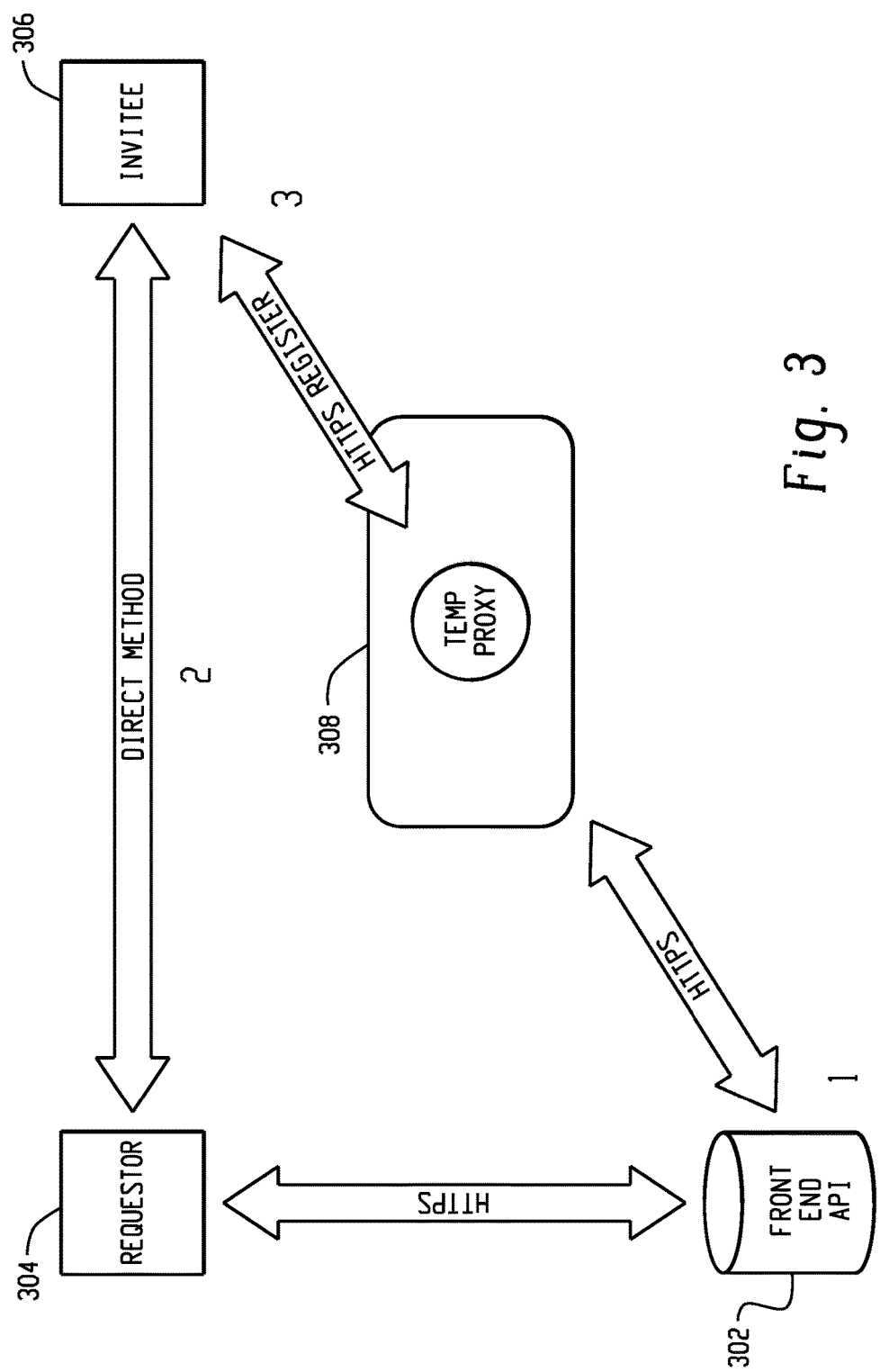
FIG. 3 is a diagram depicting an example mechanism for supplying the user a first set of credentials for accessing the first reverse proxy.

FIG. 3 is a diagram depicting an example mechanism for supplying the user a first set of credentials for accessing the first reverse proxy. In the example of FIG. 3, an intermediary (e.g., a person, a communication mechanism (a letter), or a computing device), requests credentials. An API 302 provides the first credentials to a requester 304, such as via a secure channel. The requester 304 provides the credentials to the user 306 using one of the mechanisms described above, such as near-field communication (e.g., a bump operation), a text message, an e-mail, verbally, in writing). The user 306 uses those first credentials to access a first, temporary reverse proxy 308 (e.g., as described with respect to FIG. 2) to establish a secure link with the API 302. The user 306 is then provided second access credentials for accessing a second reverse proxy.

Figure 4:
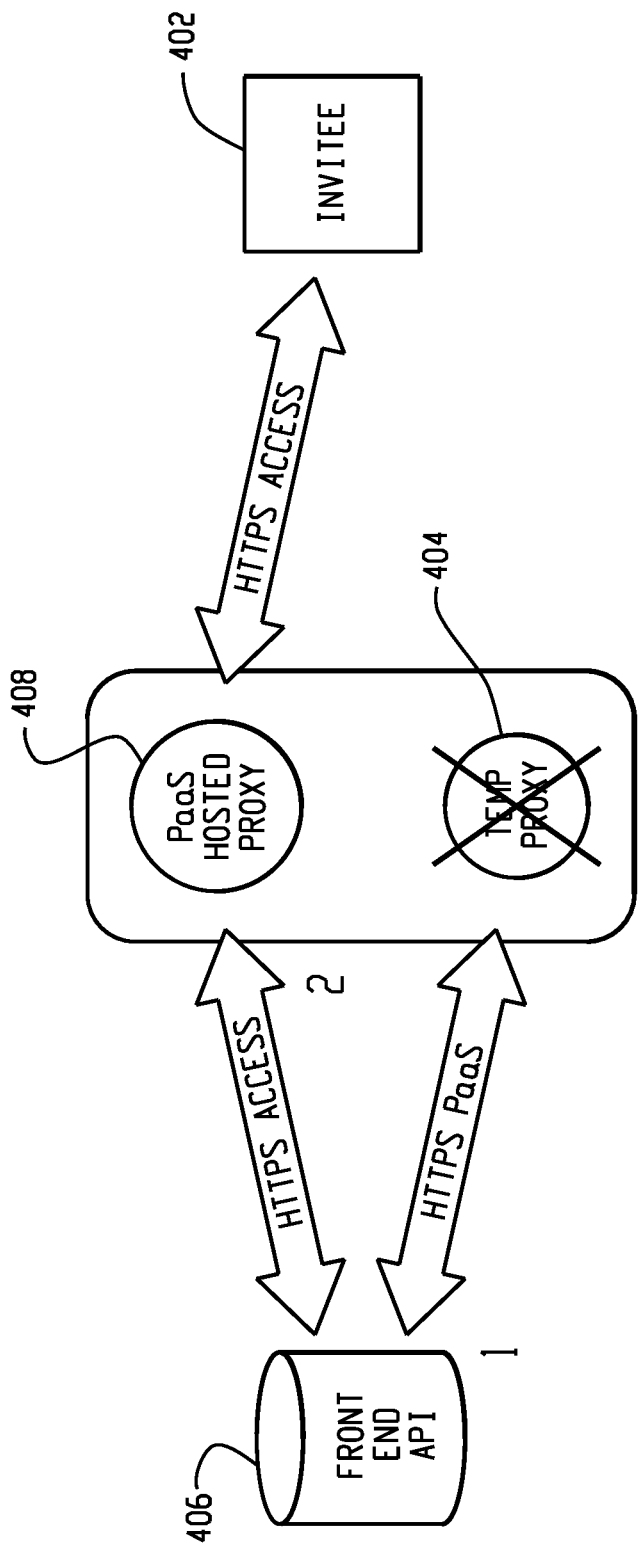
FIG. 4 is a diagram depicting the deletion of the first reverse proxy after providing the user with second credentials for accessing the second reverse proxy.
Figure 5:
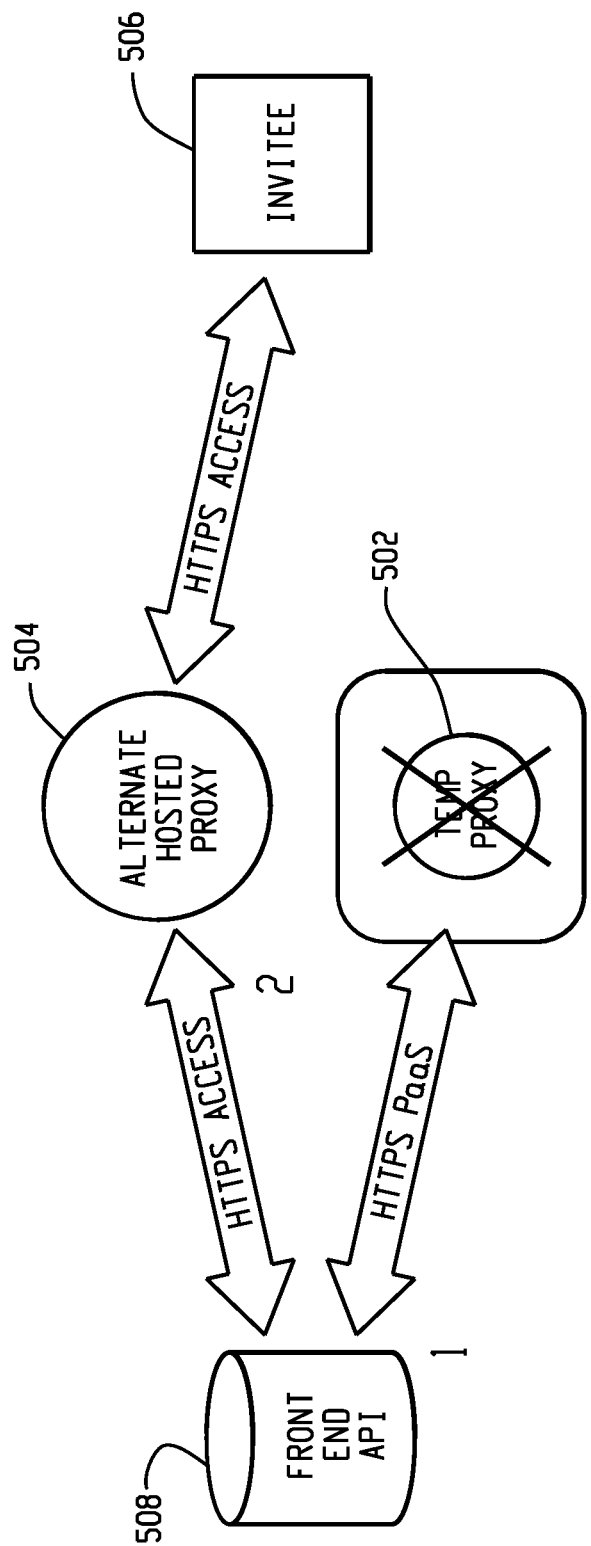
FIG. 5 is a diagram depicting a configuration that utilizes a PaaS reverse proxy as a first reverse proxy and an alternate hosted proxy as a second reverse proxy that is instantiated after the second credentials are provided to an accessing user to access an API of the service.

FIG. 4 is a diagram depicting the deletion of the first reverse proxy after providing the user with second credentials for accessing the second reverse proxy. In the example of FIG. 4, the user 402 has utilized a first reverse proxy 404 to connect with the API 406. Via a secure link and the first reverse proxy 404, the API has provided second credentials to the user 402. The first reverse proxy 404 is then no longer needed and is deallocated. At this time, the second reverse proxy, indicated at 408 is initiated. The user 402 uses the second credentials provided by the API to access a second reverse proxy 408. Via a secure link and the second reverse proxy 408, the user 402 interacts with the API 406 and its associated service. In the example of FIG. 4, both the first reverse proxy 404 and the second reverse proxy 408 are provided by a PaaS system. FIG. 5 is a diagram depicting a configuration that utilizes a PaaS reverse proxy 502 as a first reverse proxy 502, and an alternate hosted proxy (e.g., a reverse proxy provided by a user of the service) as a second reverse proxy 504 that is instantiated after the second credentials are provided to an accessing user 506 to access an API 508 of the service.

Figure 6:
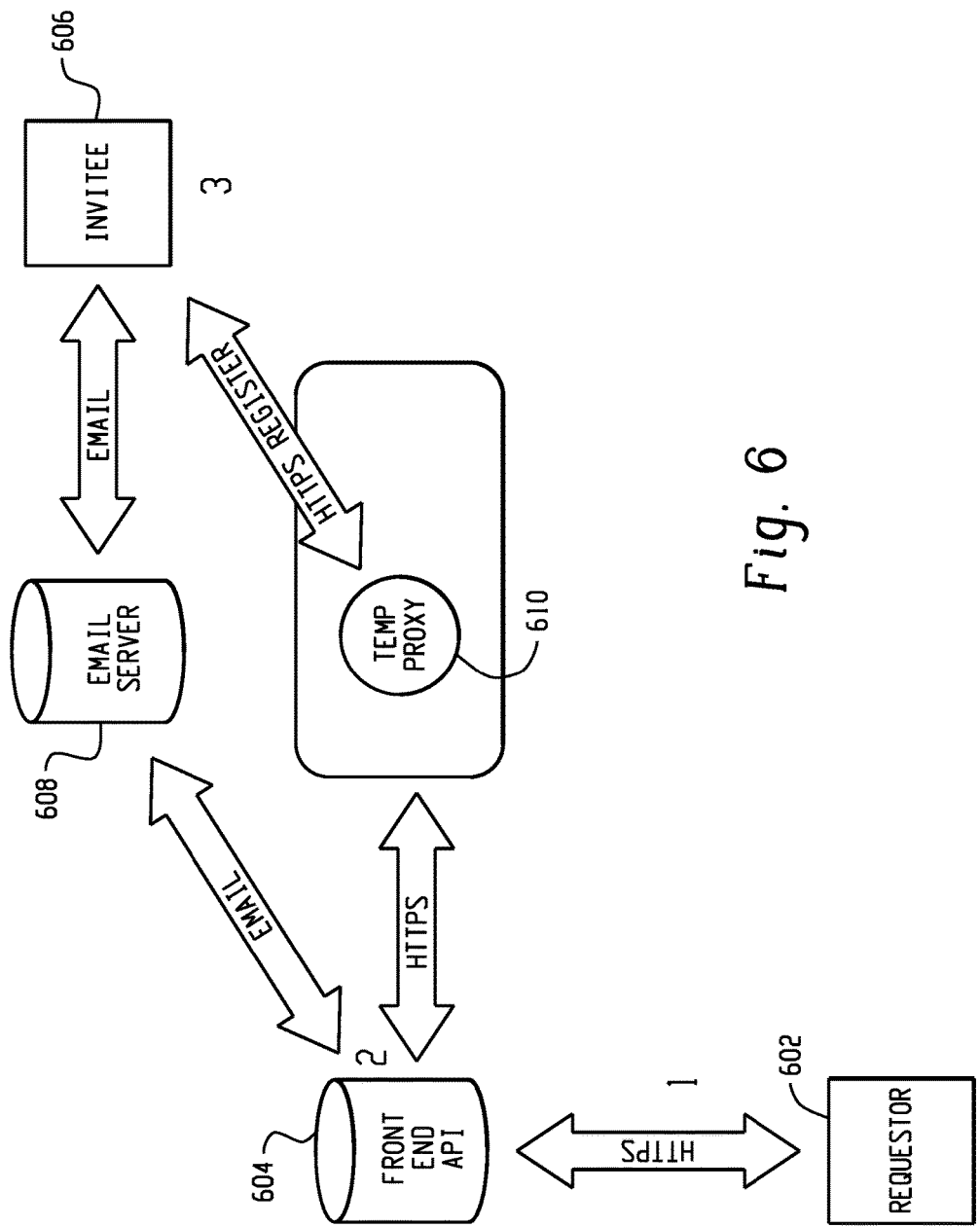
FIG. 6 is a diagram depicting an alternate process for providing first credentials to a user for accessing a first reverse proxy server.

FIG. 6 is a diagram depicting an alternate process for providing first credentials to a user for accessing a first reverse proxy server. In the environment of FIG. 6, a requester 602 is not provided with the first credentials. Instead, the requester 602 provides a request to the API 604 that the first credentials be supplied to the user 606 in a manner that does not expose the requester 602 to the credentials. On request of the requester 602, the first credentials are supplied to an email address of the user 606 via an email server 608. Those first credentials are utilized by the user 606 to access a first reverse proxy 610 to establish a secure connection for receipt of the second set of credentials.

Figure 7:
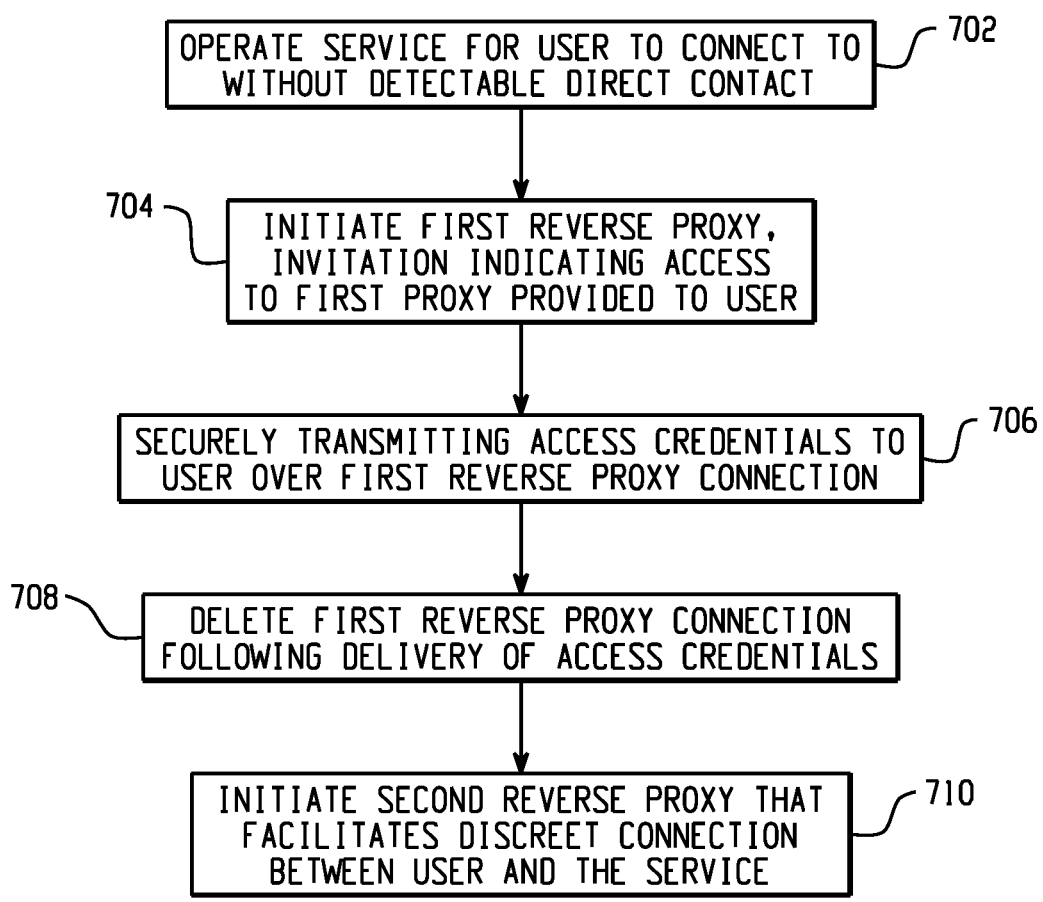
FIG. 7 is a flow diagram depicting a computer-implemented method of facilitating a discreet connection between a user and a service.

FIG. 7 is a flow diagram depicting a computer-implemented method of facilitating a discreet connection between a user and a service. At 702, a service for a user to connect to without any detectable direct contact with the service is operated. At 704, a first reverse proxy connection is initiated that is configured to receive a connection from the user to set up the discreet connection, where an invitation indicating a mechanism for accessing the first reverse proxy connection is provided to the user. At 706, access credentials are transmitted to the user over the first reverse proxy connection, the access credentials including an address for accessing a second reverse proxy connection. At 708, the first reverse proxy connection is deleted following delivery of the access credentials, and at 710, the second reverse proxy connection that facilitates the discreet connection between the user and the service without any detectable direct contact with the service is initiated.

Figure 8A:
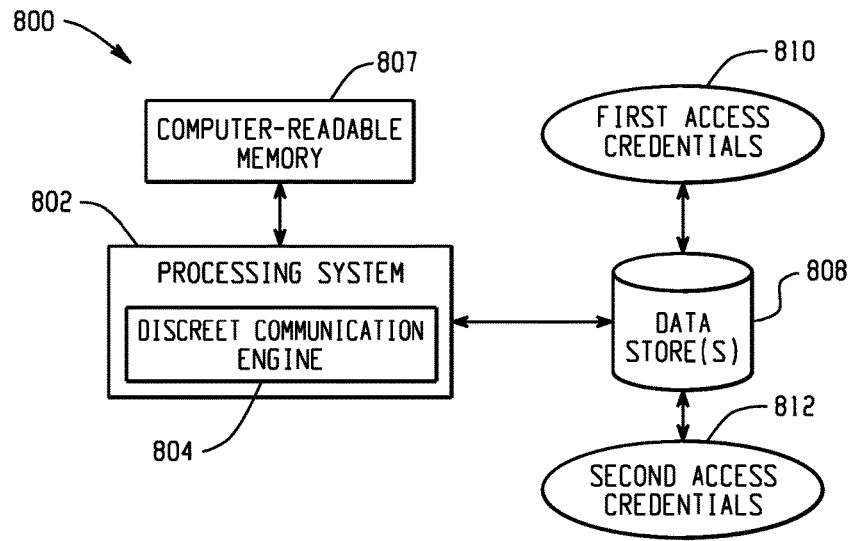
FIGS. 8A, 8B, and 8C depict example systems for implementing the approaches described herein for providing discrete access to a service.
Figure 8B:
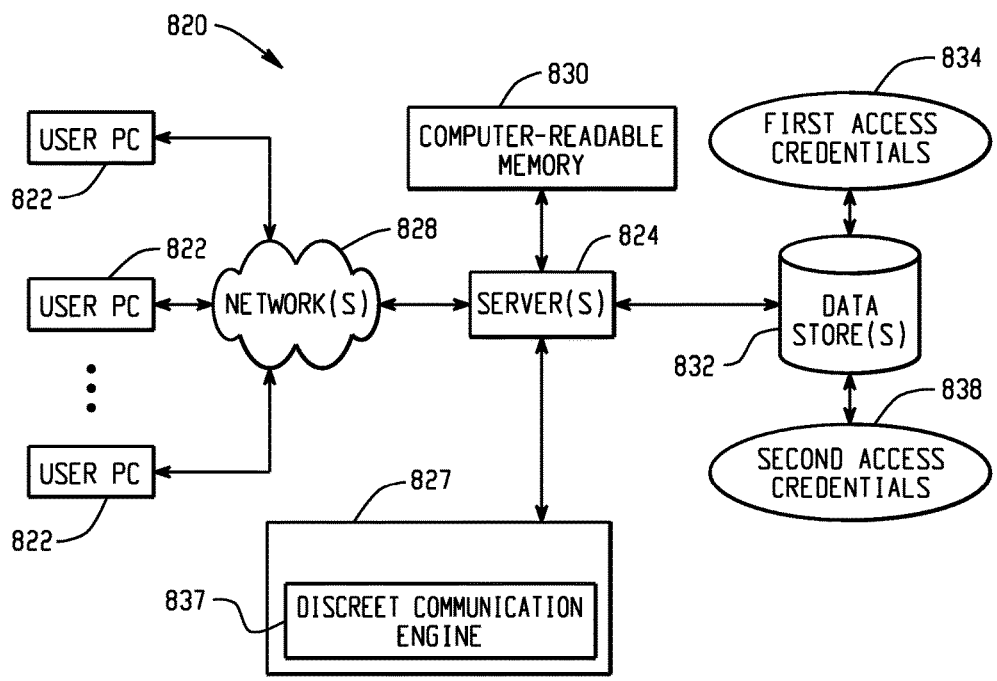
Figure 8C:
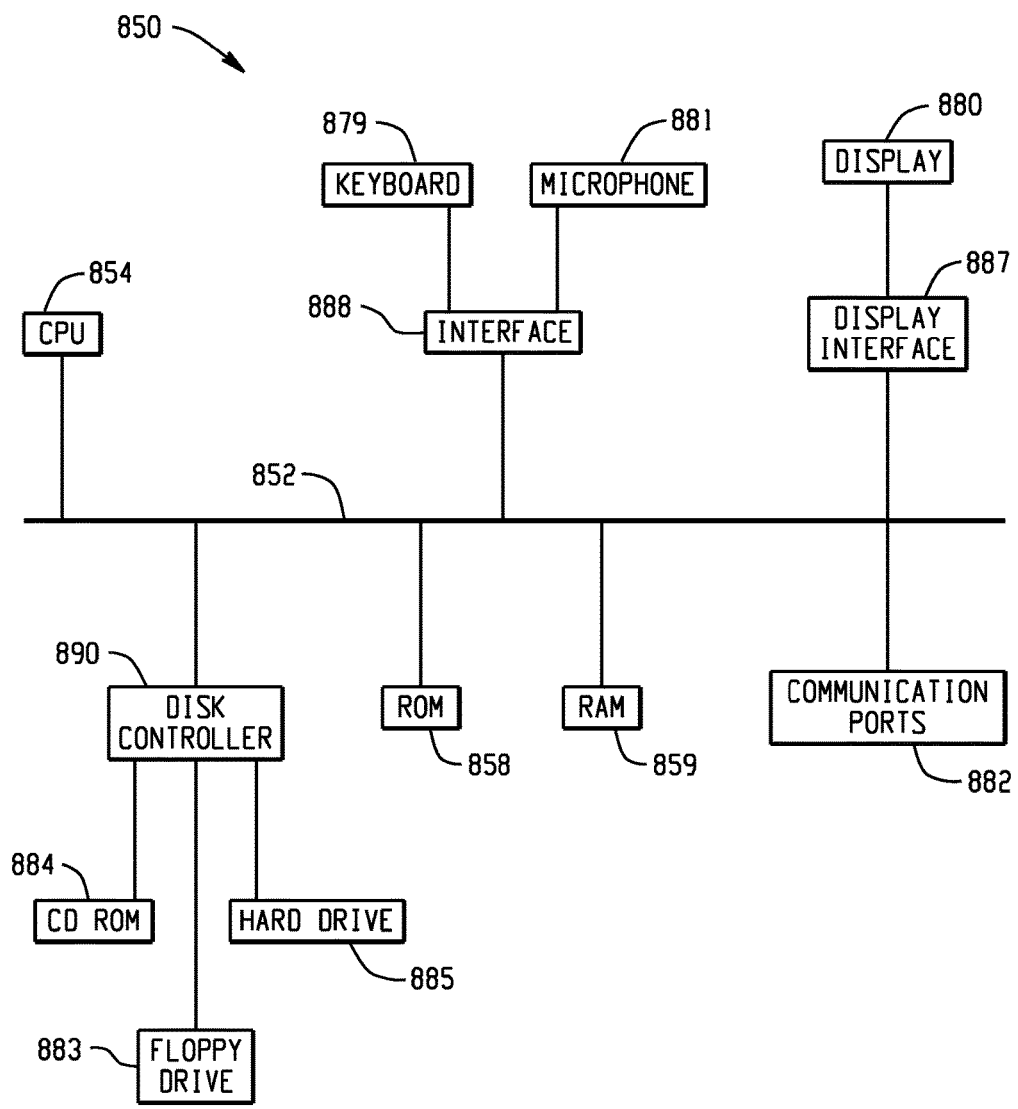

FIGS. 8A, 8B, and 8C depict example systems for implementing the approaches described herein for facilitating discrete access to a server. For example, FIG. 8A depicts an exemplary system 800 that includes a standalone computer architecture where a processing system 802 (e.g., one or more computer processors located in a given computer or in multiple computers that may be separate and distinct from one another) includes a discrete communication engine 804 being executed on the processing system 802. The processing system 802 has access to a computer-readable memory 807 in addition to one or more data stores 808. The one or more data stores 808 may include first access credentials 810 as well as second access credentials 812. The processing system 802 may be a distributed parallel computing environment, which may be used to handle very large-scale data sets.

FIG. 8B depicts a system 820 that includes a client-server architecture. One or more user PCs 822 access one or more servers 824 running a discrete communication engine 837 on a processing system 827 via one or more networks 828. The one or more servers 824 may access a computer-readable memory 830 as well as one or more data stores 832. The one or more data stores 832 may include first access credentials 834 as well as second access credentials 838.

FIG. 8C shows a block diagram of exemplary hardware for a standalone computer architecture 850, such as the architecture depicted in FIG. 8A that may be used to include and/or implement the program instructions of system embodiments of the present disclosure. A bus 852 may serve as the information highway interconnecting the other illustrated components of the hardware. A processing system 854 labeled CPU (central processing unit) (e.g., one or more computer processors at a given computer or at multiple computers), may perform calculations and logic operations required to execute a program. A non-transitory processor-readable storage medium, such as read only memory (ROM) 858 and random access memory (RAM) 859, may be in communication with the processing system 854 and may include one or more programming instructions for performing the method of facilitating discrete access to a server. Optionally, program instructions may be stored on a non-transitory computer-readable storage medium such as a magnetic disk, optical disk, recordable memory device, flash memory, or other physical storage medium.

In FIGS. 8A, 8B, and 8C, computer readable memories 807, 830, 858, 859 or data stores 808, 832, 883, 884, 888 may include one or more data structures for storing and associating various data used in the example systems for facilitating discrete access to a server. For example, a data structure stored in any of the aforementioned locations may be used to store data from XML files, initial parameters, and/or data for other variables described herein. A disk controller 890 interfaces one or more optional disk drives to the system bus 852. These disk drives may be external or internal floppy disk drives such as 883, external or internal CD-ROM, CD-R, CD-RW or DVD drives such as 884, or external or internal hard drives 885. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 890, the ROM 858 and/or the RAM 859. The processor 854 may access one or more components as required.

A display interface 887 may permit information from the bus 852 to be displayed on a display 880 in audio, graphic, or alphanumeric format. Communication with external devices may optionally occur using various communication ports 882.

In addition to these computer-type components, the hardware may also include data input devices, such as a keyboard 879, or other input device 881, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented system for facilitating a discreet connection between a user and a service, comprising:
 a service server executing the service for the user to connect to without any detectable direct contact with the service;
 a first reverse proxy server connected to the service server, the first reverse proxy server configured to establish a first reverse proxy connection with the user, the first reverse proxy connection being established upon receiving a request from the user to access the first reverse proxy server, wherein an invitation indicating a mechanism for accessing the first reverse proxy server is provided to the user prior to the accessing; and a second reverse proxy server connected to the service server, the second reverse proxy server configured to establish a second reverse proxy connection with the user, the second reverse proxy connection facilitating the discreet connection between the user and the service without any detectable direct contact between the user and the service, the second reverse proxy connection being established upon receiving a request from the user to access the second reverse proxy server, the request being based on access credentials transmitted to the user over the first reverse proxy connection, and the first reverse proxy connection being deleted following delivery of the access credentials.

2. The system of claim 1, wherein an address for the first reverse proxy connection is transmitted to the user in an invitation.

3. The system of claim 2, wherein an invitation sender is provided no data on use of the second reverse proxy connection or how to access the second reverse proxy connection.

4. The system of claim 1, wherein an address for the first reverse proxy connection is transmitted to the user by: a social media message, a near field communication message, a verbal communication, a written communication, a text message, or a quick response code.

5. The system of claim 1, wherein the first reverse proxy connection and the second reverse proxy connection are provided by a third party proxy provider.

6. The system of claim 1, wherein the second reverse proxy connection is provided by a second user of the service, wherein the user connects to the second reverse proxy connection using a hardware host of the second user, and wherein the second user is unaware of a continued use of the second reverse proxy connection by the user.

7. The system of claim 6, wherein the hardware host is a desk top computer, a smart phone device, a tablet device, or a mobile phone.

8. The system of claim 1, wherein the first reverse proxy connection is available for a limited period of time.

9. The system of claim 1, wherein the second reverse proxy is deleted when the user ceases to use the second reverse proxy.

10. The system of claim 1, wherein the first reverse proxy connection enables the user to register with the service.

11. The system of claim 1, wherein the access credentials are transmitted to the user over the first reverse proxy connection via a secure sockets layer transmission or an encrypted transmission.

12. The system of claim 1, wherein the second reverse proxy connection is requested and set up by the service after the user connects to the first reverse proxy connection.

13. The system of claim 1, wherein the discreet connection is established without any direct communication from the service to the user.

14. A computer-implemented method of facilitating a discreet connection between a user and a service, comprising:

operating the service for a user to connect to without any detectable direct contact with the service;
connecting to a first reverse proxy server;
providing, to the user, an invitation indicating a mechanism for accessing the first reverse proxy server;
establishing a first reverse proxy connection with the user the first reverse proxy connection being established upon receiving a request from the user to access the first reverse proxy server, wherein an invitation indicating a mechanism for accessing the first reverse proxy connection is provided to the user prior to the accessing;
connecting to a second reverse proxy server;
transmitting access credentials to the user over the first reverse proxy connection, the access credentials including an address for accessing the second reverse proxy connection;
deleting the first reverse proxy connection following delivery of the access credentials; and
establishing the second reverse proxy connection with the user, the second reverse proxy connection facilitating the discreet connection between the user and the service without any detectable direct contact between the user and the service, the second reverse proxy connection being established upon receiving a request from the user to access the second reverse proxy server, the request being based on the access credentials, and the first reverse proxy connection being deleted following delivery of the access credentials.

15. The method of claim 14, wherein an address for the first reverse proxy connection is transmitted to the user in an invitation.

16. The method of claim 15, wherein an invitation sender is provided no data on use of the second reverse proxy connection or how to access the second reverse proxy connection.

17. The method of claim 14, wherein the first reverse proxy connection and the second reverse proxy connection are provided by a third party proxy provider.

18. The method of claim 14, wherein the second reverse proxy connection is provided by a second user of the service, wherein the user connects to the second reverse proxy connection using a hardware host of the second user, and wherein the second user is unaware of a continued use of the second reverse proxy connection by the user.

19. The method of claim 14, wherein the access credentials are transmitted to the user over the first reverse proxy connection via a secure sockets layer transmission or an encrypted transmission.

20. A non-transitory computer-readable medium encoded with instructions for commanding one or more data processors to execute a method of facilitating a discreet connection between a user and a service, the method comprising:

operating the service for a user to connect to without any detectable direct contact with the service;
connecting to a first reverse proxy server;
providing, to the user, an invitation indicating a mechanism for accessing the first reverse proxy server;
establishing a first reverse proxy connection with the user upon receiving a request from the user to access the first reverse proxy server, the request being based on the mechanism;
transmitting access credentials to the user over the first reverse connection, the access credentials including an address for accessing a second reverse proxy connection;
deleting the first reverse proxy connection following delivery of the access credentials; and
initiating the second reverse proxy connection that facilitates the discreet connection between the user and the service without any detectable direct contact with the service;

operating the service for a user to connect to without any detectable direct contact with the service;

establishing a first reverse proxy connection with the user the first reverse proxy connection being established upon receiving a request from the user to access the first reverse proxy server, wherein an invitation indicating a mechanism for accessing the first reverse proxy connection is provided to the user prior to the accessing;

connecting to a second reverse proxy server;

transmitting access credentials to the user over the first reverse proxy connection, the access credentials including an address for accessing the second reverse proxy connection;

deleting the first reverse proxy connection following delivery of the access credentials; and establishing the second reverse proxy connection with the user, the second reverse proxy connection facilitating the discreet connection between the user and the service without any detectable direct contact between the user and the service, the second reverse proxy connection being established upon receiving a request from the user to access the second reverse proxy server, and the request being based on the access credentials.

* * * * *